F. KAMROWSKI.
WINDSHIELD ATTACHMENT.
APPLICATION FILED SEPT. 23, 1920.
1,379,104.
Patented May 24, 1921.
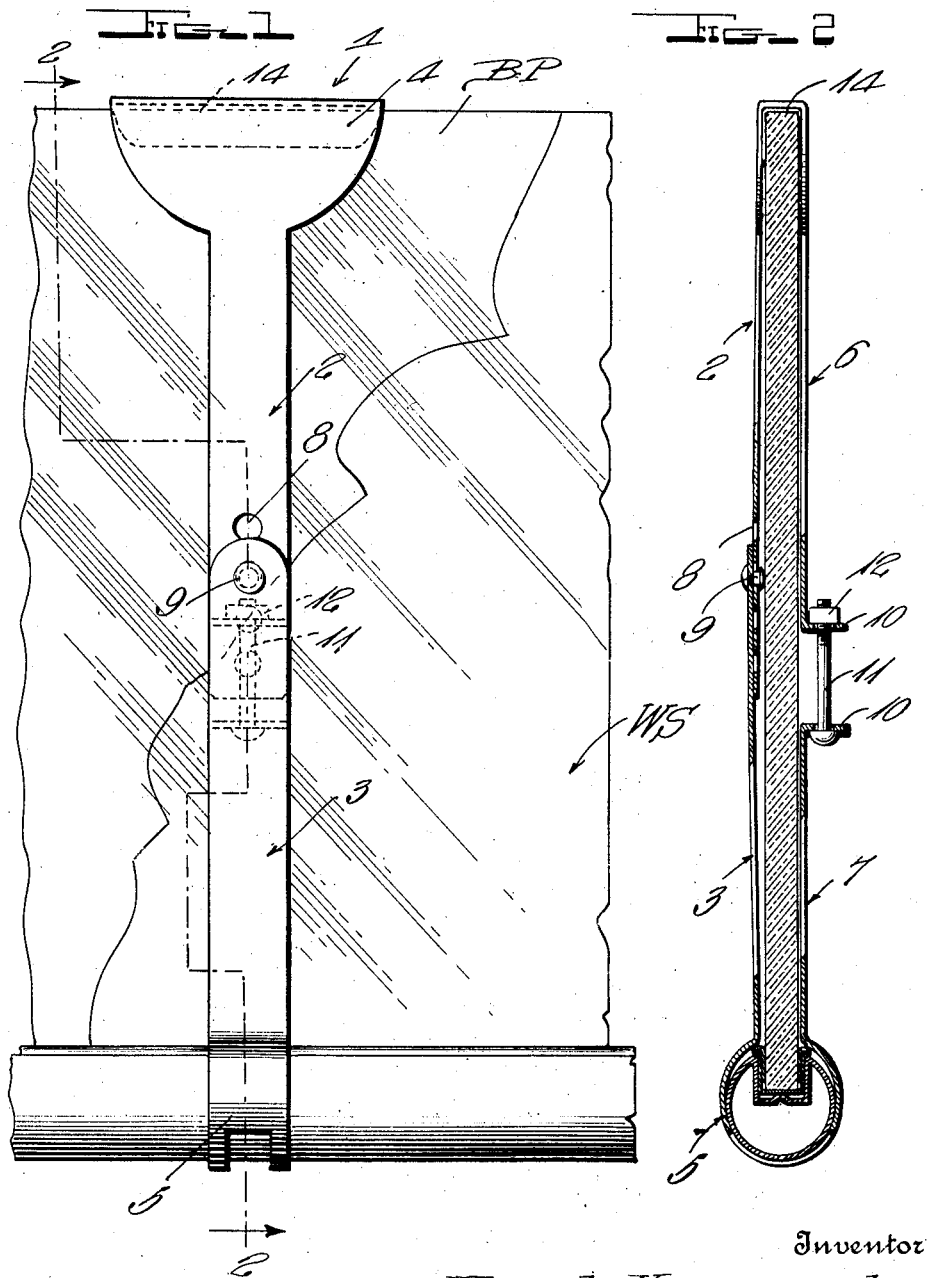
Inventor
Frank Kamrowski
By H. B. Willson & Co.
Attorneys

UNITED STATES PATENT OFFICE.

FRANK KAMROWSKI, OF STEVENS POINT, WISCONSIN.

WINDSHIELD ATTACHMENT.

1,379,104. Specification of Letters Patent. Patented May 24, 1921.

Application filed September 23, 1920. Serial No. 412,332.

*To all whom it may concern:*

Be it known that I, FRANK KAMROWSKI, a citizen of the United States, residing at Stevens Point, in the county of Portage and State of Wisconsin, have invented certain new and useful Improvements in Windshield Attachments; and I do declare the following to be a full, clear, and exact description of the invention, such as will enable others skilled in the art to which it appertains to make and use the same.

This invention relates to an improved windshield attachment in the form of a clamp which is especially designed for retaining the sections of a broken windshield together, although, it is not to be restricted to use on windshields, because it may be equally well used on other broken panes of glass or various other articles.

It is customary when an automobile windshield becomes broken or cracked so as to separate it into two or more sections, to replace it with an entirely new pane of glass. This practice is exceedingly expensive, and in many cases, considerable time is lost in procuring the kind of glass desired to fit the particular windshield frame from which the broken sections have been removed.

It is my intention, as above indicated, and the main object of this invention to provide a novel clamp to be fitted on a windshield to retain the broken or cracked sections thereof together, thus making it possible for the old windshield to give a much longer service and saving the owner the expense of buying an entirely new pane of glass.

Another object of the invention is to provide a clamp of the above mentioned type which is composed of adjustable members which enables the same clamp to be used on various sizes of windshields.

Other objects and advantages of the invention will be apparent during the course of the following description.

In the accompanying drawing forming a part of this specification and in which like numerals are employed to designate like parts throughout the same:

Figure 1 is an elevational view of a portion of a windshield, showing the broken sections thereof and my improved clamp attached thereto.

Fig. 2 is a sectional view taken on the plane of the line 2—2 of Fig. 1, looking in the direction of the arrows.

Referring to the drawing, wherein the preferred embodiment of my invention is clearly illustrated, it will be seen that the letters W—S designate one of the sections of an automobile windshield of conventional construction, the pane of glass thereof being illustrated as cracked and forming two broken portions B—P.

My improved attachment, as before stated, is in the form of a clamp designated as a whole by the numeral 1, the same including two adjustably connected members 2 and 3, and each member being adapted to engage one of the broken parts of the windshield glass to retain these broken parts together and prevent accidental displacement. Members 2 and 3 include channel portions 4 and 5, respectively, the channel portion 4 of the upper member being adapted to fit over the edge of one of the broken parts of the pane of glass, while the channel 5 of the lower member is slotted and shaped to engage the tubular metal bead of the windshield in the manner disclosed. In addition to the channel portions, the members include spaced arms 6 and 7 which are adapted to extend on opposite sides of the glass to prevent lateral separation of the broken portions of the latter. Careful examination of these arms will disclose the fact that they are detachably and adjustably connected together to facilitate in application of the device and permit it to effectively grip windshields of various sizes. This adjustable and detachable connection of the arms may be of any suitable construction and by preference it is of the construction and arrangement disclosed. By referring to the showing of this construction, it will be seen that one of the arms 6 of the member 2 is provided with a plurality of alined closely spaced apertures 8 and the corresponding arm 7 of the other member 3 is provided with a headed stud 9 adapted to extend through one of the apertures to detachably and adjustably connect these arms together. The arms on the other side of the pane of glass, each have their free ends laterally bent as indicated at 10 and each of these laterally bent portions is apertured to permit passage of a retaining bolt 11 therethrough. It is to be noted that the nut 12 is preferably square so that one of its sides bears against the vertical part of the arm 6 and it is thereby prevented from rotating and consequently these ends of the arms 6 and 7 will not become accidentally disconnected. It may be well to mention, at this point that, if desired, a cushion member 14 in the form of a piece of rubber or the like may be placed in the channel 4 to permit a slight yielding action to be had between the members and to prevent direct contact of the metal channel with the glass, thus reducing the possibility of breakage due to over-tightening of the bolt.

The foregoing description clearly sets forth the construction and arrangement of my improved clamp and since this description is thought to be sufficient to enable persons skilled in the art to which this invention relates to obtain a clear understanding of the same, it is not thought necessary to set forth the manner in which the device is applied, this being clearly obvious.

A device of the construction and arrangement disclosed is extremely advantageous since it will effectively clamp two broken sections of a pane of glass, either a windshield or a windowpane, together. The arms of the members of my clamp coact with the broken sections of the pane in such a manner as to prevent lateral disconnection of the latter. The means for connecting these arms together is such that the device is adaptable for use on various sizes of windshields and it is very easily removed and applied due to the detachable connection of these arms. In case the windshield is broken in such a way that the existing parts of the pane cannot be effectively connected together with my clamp, one of the broken parts may be removed and the ragged edge of the other broken part straightened and a new piece of glass may be fitted in place of the removed part. These and other advantages have, no doubt, become apparent from the foregoing description.

Since probably the best results may be obtained with the construction and arrangement disclosed, this construction and arrangement is taken as the preferred embodiment of my invention. However, I wish it to be understood that various minor changes in the shape, size, and arrangement of parts may be resorted to as long as no departure from the spirit of the invention or the scope of the subjoined claims is made.

I claim:

1. A device of the class described comprising a clamp composed of two adjustably connected members, each member including a channel portion to fit the edge of the glass and spaced arms to extend on opposite sides of the glass sections.

2. A device of the class described comprising a clamp composed of two members, each of which includes a channel portion and spaced parallel arms to extend on opposite sides of the broken section of the pane of glass, one of the arms of one section being provided with a plurality of closely spaced apertures, and the corresponding arm of the other section being provided with a headed stud receivable in said apertures, and means to connect the other ends of the other arms together.

3. A device of the class described comprising a clamp composed of two members, each of which includes a channel portion and spaced parallel arms to extend on opposite sides of the broken section of the pane of glass, one of the arms of each section being provided with a laterally directed apertured end portion, a clamping bolt passing through the apertures, the other ends of the other arms being adjustably connected together.

4. A device for repairing a broken windshield comprising a clamp composed of two members, including a channel portion and spaced parallel arms to extend on opposite sides of the broken section of the windshield, the ends of the arms on one side of the shield being connected together by a quick detachable connection, and a bolt and nut for connecting the ends of the remaining arms together.

5. A device for repairing a broken windshield comprising a clamp composed of upper and lower strap-members, said upper member being provided with a relatively wide channel portion for receiving the upper edge of the glass, and comparatively narrow arms to extend on opposite sides of the latter, one of said arms being provided with a plurality of space apertures, the other arm having its free end directed laterally outward and apertured, the lower strap-member including a central channel portion to receive the horizontal bead of the windshield frame, said channel portion being slotted to render it highly resilient, the last-named strap-member being also equipped with spaced parallel arms extending on opposite sides of the windshield glass, one of said arms carrying a headed stud for co-action with the apertures in the first-named arm of said upper-strap member, the remaining arm of the lower strap-member having its extremities bend laterally outward and apertured, and a bolt passing through the apertures and the laterally bent end of said arm.

In testimony whereof I have hereunto set my hand.

FRANK KAMROWSKI.